United States Patent
Du et al.

(10) Patent No.: US 8,657,030 B2
(45) Date of Patent: Feb. 25, 2014

(54) CORDLESS POWER TOOL HAVING MULTI-SPEED TRANSMISSION AND CONSTANT SPEED IN LIGHT TORQUE RANGE

(75) Inventors: Hung T. Du, Towson, MD (US); Josh West, Towson, MD (US)

(73) Assignee: Black & Decker Inc., Newark, DE (US)

( * ) Notice: Subject to any disclaimer, the term of this patent is extended or adjusted under 35 U.S.C. 154(b) by 674 days.

(21) Appl. No.: 12/224,358

(22) PCT Filed: Mar. 2, 2007

(86) PCT No.: PCT/US2007/005260
§ 371 (c)(1),
(2), (4) Date: Aug. 25, 2008

(87) PCT Pub. No.: WO2007/103109
PCT Pub. Date: Sep. 13, 2007

(65) Prior Publication Data
US 2009/0101379 A1    Apr. 23, 2009

Related U.S. Application Data

(60) Provisional application No. 60/779,293, filed on Mar. 3, 2006.

(51) Int. Cl.
*B23B 45/02*    (2006.01)

(52) U.S. Cl.
USPC .............................................. 173/176; 173/5

(58) Field of Classification Search
USPC ...................................................... 173/176, 5
See application file for complete search history.

(56) References Cited

U.S. PATENT DOCUMENTS

| | | | |
|---|---|---|---|
| 3,446,118 A * | 5/1969 | Kuhara Tozaburo | 417/274 |
| 3,619,676 A * | 11/1971 | Kawakami et al. | 310/112 |
| 4,317,176 A | 2/1982 | Saar et al. | |
| 4,550,277 A | 10/1985 | Carney | |
| 4,619,162 A * | 10/1986 | Van Laere | 81/464 |
| 5,440,215 A | 8/1995 | Gilmore | |
| 5,731,673 A | 3/1998 | Gilmore | |
| 6,479,958 B1 | 11/2002 | Thompson et al. | |
| 6,836,614 B2 * | 12/2004 | Gilmore | 388/811 |
| 6,911,793 B2 | 6/2005 | Fritsch et al. | |
| 6,978,846 B2 * | 12/2005 | Kawai et al. | 173/2 |
| 7,088,064 B2 | 8/2006 | Brakelmann et al. | |
| 7,331,406 B2 | 2/2008 | Wottreng, Jr. et al. | |
| 2005/0045353 A1 * | 3/2005 | Kawai et al. | 173/181 |
| 2006/0137887 A1 * | 6/2006 | Ohtsu et al. | 173/2 |

* cited by examiner

*Primary Examiner* — Brian D Nash
(74) *Attorney, Agent, or Firm* — Amir Rohani; Adan Ayala

(57) ABSTRACT

A cordless power tool (300) has a transmission (12) having multiple speed ranges In the light torque range, the speed of a motor (8) of the cordless power tool is held constant to hold an output speed of the transmission (12) constant until motor power reaches a predetermined percentage of the maximum watts out of the motor.

14 Claims, 4 Drawing Sheets

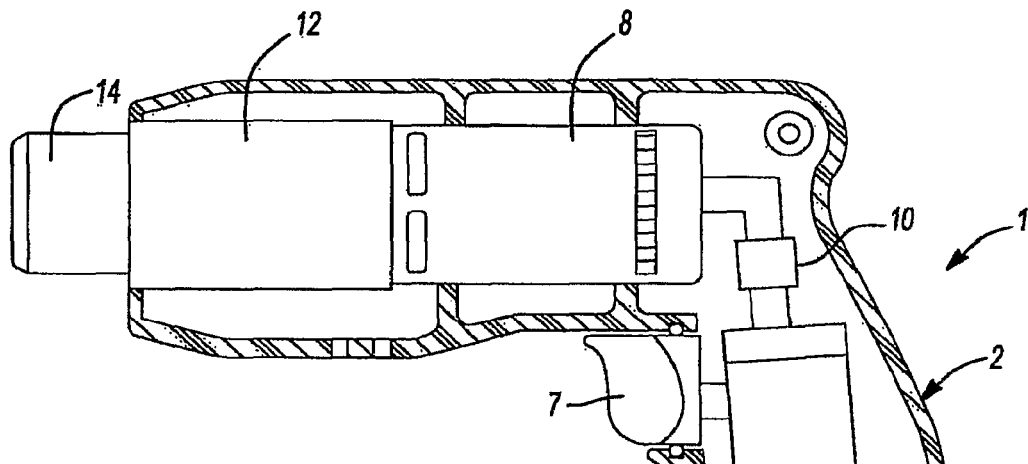
Fig-1
PRIOR ART
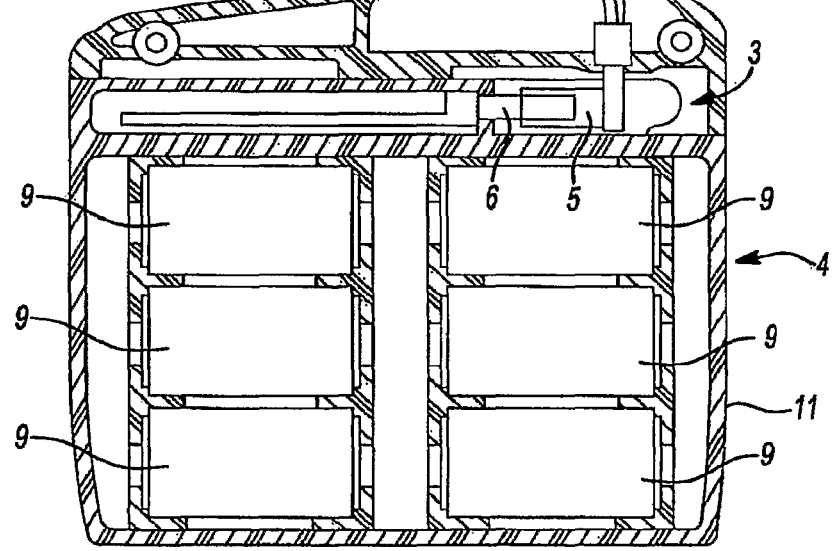

CORDLESS POWER TOOL HAVING MULTI-SPEED TRANSMISSION AND CONSTANT SPEED IN LIGHT TORQUE RANGE

CROSS-REFERENCE TO RELATED APPLICATIONS

This application claims the benefit of U.S. Provisional Application No. 60/779,293 filed Mar. 3, 2006. The disclosure of the above application is incorporated herein by reference.

FIELD OF THE INVENTION

The present invention relates to cordless power tools, and more particularly, cordless power tools having a multi-speed transmission.

BACKGROUND OF THE INVENTION

With reference to FIG. 1, a cordless power tool is illustrated and designated with reference numeral 1. The cordless power tool 1 ordinarily includes a clam shell type housing 2. The housing 2 includes a mechanism 3 to couple the housing 2 with a battery pack 4. The cordless power tool 1 includes electrical elements 5, typically included in a terminal block (not shown in FIG. 1), which couple with corresponding electrical elements 6 of the battery pack 4, also typically included in a terminal block (not shown in FIG. 1). The cordless power tool 1 includes a trigger 7, such as a trigger switch and which may be referred to herein as trigger 7, which is activated for energizing a motor 8 provided within the housing 2, as is well known in the art. Motor 8 may illustratively be a permanent magnet DC motor of the type conventionally used in cordless power tools. Normally, a plurality of battery cells 9 are disposed within the battery pack A controller 10 may be provided in housing 2 for controlling motor 8. The cordless power tool may include a gear case 12 that couples motor 8 to an output, such as an adjustable chuck 14.

In certain cordless power tools, gear case 12 includes a transmission having multiple speed ranges. For example, certain cordless drills, hammer drills and hammers have three speed transmissions, such as the DEWALT XRP series of drills, hammer drills and hammer drills. One example is the DEWALT Heavy Duty XRP 18 V Hammer Drill, model DC989VA which is a variable speed hammer drill having a three speed transmission with high, medium and low speed ranges. The transmission has an output speed that ranges from 0-2000 rpm in the high speed range, an output speed that ranges from 0 to 800 rpm in the medium speed range, and an output speed that ranges from 0 to 500 rpm in the low speed range. These speed ranges may also be referred to in terms of their torque characteristics. For example, in a transmission having high, medium and low speed ranges these ranges may be referred to as the light, medium and heavy torque ranges, the light torque range corresponding to the high speed range, the medium torque range corresponding to the medium speed range and the low speed range corresponding to the high torque range.

Variable speed control in power tools is typically accomplished by pulse width modulating the voltage applied to the motor of the power tool and varying the duty cycle of the pulse width modulation to vary the speed of the motor. FIG. 2 shows a prior art motor control circuit 110 for controlling power to a motor 112 in a cordless power tool electrical system 114 (shown representatively by dashed box 114). Cordless power tool electrical system 114 is illustratively a variable speed system, such as would be used in a variable speed drill, hammer drill or hammer of the type discussed above. Motor 112 illustratively has a permanent magnet field and a wound armature. Motor control circuit 110 includes a power switch 116, illustratively a trigger switch, having main power contacts 118 and bypass contacts 122. It may also optionally have braking contacts 120 in which case main power contacts 118 and braking contacts 120 are linked so that they operate in conjunction with each other. Main power contacts 118 are normally open and braking contacts 120 are normally closed and both are break-before-make contacts. The normally open side of main power contacts 118 is connected to the negative terminal of a battery 124 and the common side of main power contacts 118 is connected to controller 126 of motor control circuit 110. Motor control circuit 110 also includes run power switching device 128 and free wheeling diode 130.

Run power switching device 128 is illustratively a N-channel MOSFET with its gate connected to an output of controller 126, its source connected to the common side of main power contacts 118 and its drain connected the common side of braking contacts 120 of trigger switch 116, to one side of the windings of motor 112 and to the anode of diode 130. As is known, MOSFETs have diodes bridging their sources and drains, identified as diode 132 in FIG. 1. The other side of braking contacts 120 is connected to the positive side of battery 124 as is the other side of the windings of motor 112 and the cathode of diode 130. Since motor 112 is illustratively a wound armature/permanent magnet field motor, the motor windings to which the drain of run power switching device 128 and the positive side of battery 124 are connected are the armature windings.

Controller 126 is illustratively a pulse width modulator that provides a pulse width modulated signal to the gate of run power switching device 128 having a set frequency and a variable duty cycle controlled by a variable resistance. The variable resistance is illustratively a potentiometer 119 mechanically coupled to trigger switch 116. In this regard, controller 126 can be a LM 555 and potentiometer, the LM 555 configured as a pulse width modulator having a set frequency and a variable duty cycle controlled by the potentiometer that is mechanically coupled to trigger switch 116.

In operation, trigger switch 116 is partially depressed, opening braking contacts 120 and closing, a split second later, main power contacts 118. This couples power from battery 124 to controller 126, to the source of run power switching device 128 and to bypass contacts 122 (that remain open at this point). Controller 126 generates a pulse width modulated signal at the gate of run power switching device 128, cycling it on and off. Run power switching device 128 switches power on and off to the windings of motor 112 as it cycles on and off. The duty cycle of the pulse width modulated signal, that is, how long it is high compared to how long it is low, provided at the gate of run power switching device 128 is determined by how far trigger switch 116 is depressed. (How far trigger switch 116 is depressed determines the variable resistance of the potentiometer 119 mechanically coupled to it that provides the variable resistance used to set the duty cycle of controller 126.) The duty cycle of the pulse width modulated signal determines the speed of motor 112. As trigger switch 116 is depressed further, bypass contacts 122 close, typically when trigger switch 116 is depressed to about the eighty percent level. When bypass contacts 122 close, power is connected directly from the battery 124 to the motor windings and the variable speed control provided by controller 126 and run power switching device 128 is bypassed. Motor 112 then runs at full speed.

Diode 130, known as a freewheeling diode, provides a path for the current in the windings of motor 112 when run power switching device 128 switches from on to off. Current then flows out of the motor windings at the bottom of motor 112 (as oriented in FIG. 1) through diode 130 and back into the motor windings at the top of motor 112 (as oriented in FIG. 1).

SUMMARY OF THE INVENTION

A cordless power tool has a transmission having multiple speed ranges. In the light torque range, the speed of the motor of the cordless power tool is held constant to hold an output speed of the transmission constant until motor power reaches a predetermined percentage of the maximum watts out of the motor. In an aspect, the predetermined percentage is no more than seventy-five percent of maximum watts out. In an aspect, the predetermined percentage is seventy percent of maximum watts out.

In an aspect, the constant output speed of the transmission when in the light torque range is at least 1800 rpm.

In an aspect, the motor has a maximum no-load speed that is at least fifty percent higher than the constant speed at which the motor is run when the transmission is in the light torque range.

In an aspect, the speed of the motor is controlled by varying the duty cycle of a pulse width modulated signal that powers the motor and the duty cycle is varied from seventy percent to one-hundred percent when holding the motor speed constant when the transmission is in the light torque range.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a side sectional view of a prior art cordless power tool;

DETAILED DESCRIPTION OF THE PREFERRED EMBODIMENTS

The following description of the preferred embodiment(s) is merely exemplary in nature and is in no way intended to limit the invention, its application, or uses.

Figure 3:
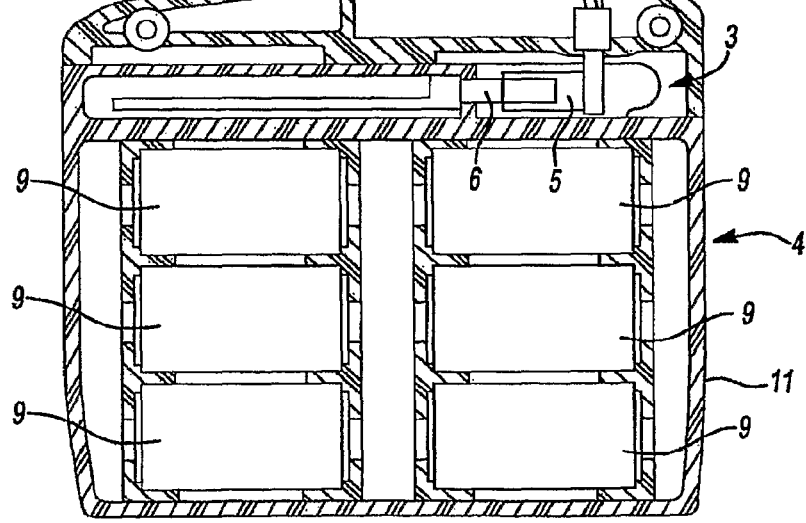
FIG. 3 is a side sectional view of a cordless power tool in accordance with the invention.
Figure 4:
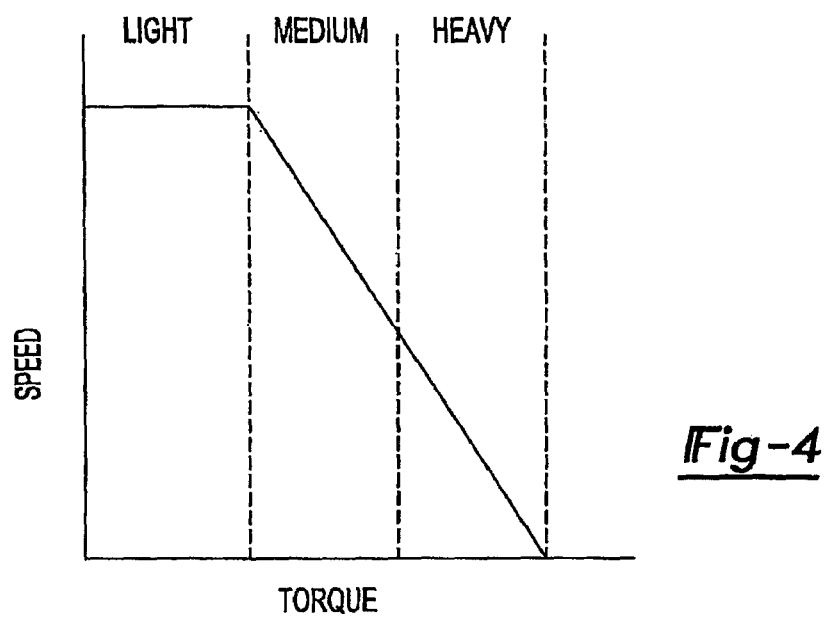
FIG. 4. is a graph showing speed control in a cordless power tool having a multiple speed transmission when the transmission is in the light torque range.

FIG. 3 shows a cordless power tool 300 in accordance with an aspect of the invention. Elements in common with FIG. 1 will be identified with like reference numbers and the only the differences discussed. Gear case 12 of cordless power tool 300 includes a multi-speed transmission as discussed above, illustratively having three speed ranges. It should be understood, however, that the multi-speed transmission could have more than three speed ranges, or two speed ranges. In an aspect, the invention is directed to the control of the speed of motor 8 of cordless power tool 300 by motor control circuit 302 when the transmission of gear case 12 is in the light torque range. It should be understood that the light torque range is the lightest torque range of the multi-speed transmission and is also the highest speed range. Motor control circuit 302 is configured to maintain the speed of motor 8 constant across the light torque range, as shown in FIG. 4, to keep the output speed of the transmission and thus of gear case 12 constant until motor power reaches a predetermined percentage of maximum watts out of the motor. By maintaining the output speed of the transmission and thus of gear case 12 constant when the transmission is in the light torque range and motor power is at or below the predetermined percentage of the motor's maximum watts out, performance when operating cordless power tool 300 in the light torque range is optimized. That is, instead of the speed dropping as torque increases when in the light torque range, the speed will be maintained constant so that the task for which cordless power tool is being used is completed faster. For example, if cordless power tool 300 is a drill and is being used to tighten a small screw such as in a 2×4, it is operated in the light torque range. By keeping the speed constant when in the light torque range, the speed won't drop as the load on cordless power tool 300 increases as the screw is tightened into the 2×4. Similarly, if the tool is a hammer drill it is typically operated in the light torque range when being used as a hammer. And the hammer mechanism typically has optimum performance at a set number of beats per minute, which corresponds to a set speed from the transmission. For example, a hammer mechanism may have optimum performance at 34,000 beats per minute which corresponds to a 2,000 RPM output speed of the transmission. By maintaining the speed of the motor constant when in the high speed/light torque range, which maintains the output speed of the transmission constant such as 2,000 rpm, the hammer mechanism is operated at its optimal beats per minute. In this regard, a hammer drill when used as a hammer is typically not loaded to the point where motor power exceeds the predetermined percentage, such as seventy-five percent of the motor's maximum watts out.

As illustrated in FIG. 4, the transmission in gear case 12 of cordless power tool 300 has three speed ranges, which in terms of torque, are the light torque, medium torque and heavy torque ranges. In the light torque range, the motor speed is held constant as long as motor power is at or below a predetermined percentage of the motors maximum watts out. When motor power exceeds the predetermined percentage, motor speed is no longer held constant but allowed to drop following the natural torque-speed curve of the motor. As is known, a motor's maximum watts, such as a permanent magnet DC motor, occurs at ½ no-load speed times ½ stall torque.

In an aspect, the predetermined percentage is no more than seventy-five percent of the motor's maximum watts out. In an aspect, predetermined percentage is seventy percent of the motor's maximum watts out.

In an aspect, the speed at which the output of the transmission of gear case 12 of cordless power tool 300 is kept constant when the transmission is in the light torque range is at least 1800 rpm. In an aspect, the speed at which the output of the transmission of gear case 12 is kept constant when the transmission is in the light torque range is at least 2000 rpm. In an aspect, the speed at which the output of the transmission of gear case 12 is kept constant when the transmission is in the light torque range is at least 2500 rpm.

Figure 2:
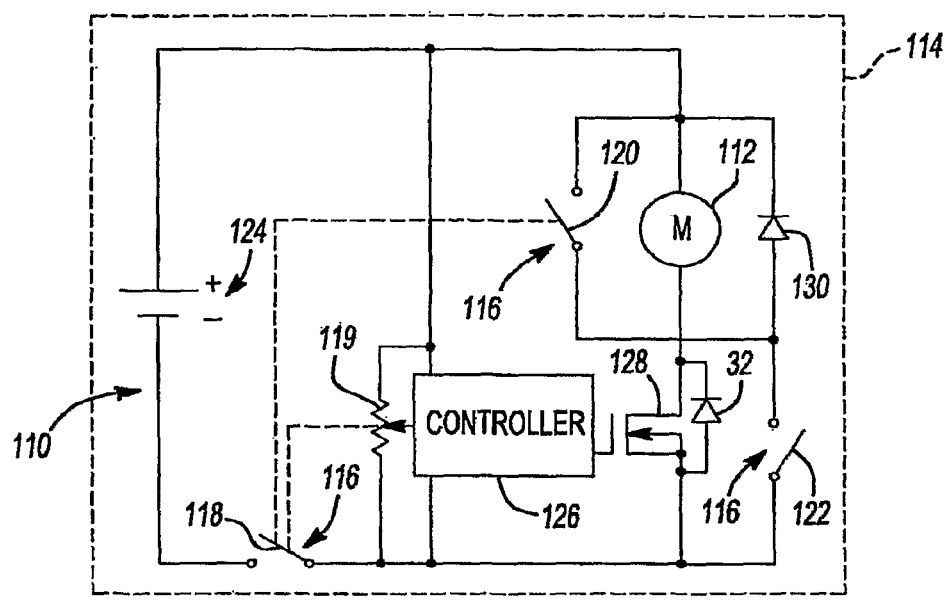
FIG. 2 is a schematic of a prior art motor control circuit in a cordless power tool.
Figure 5:
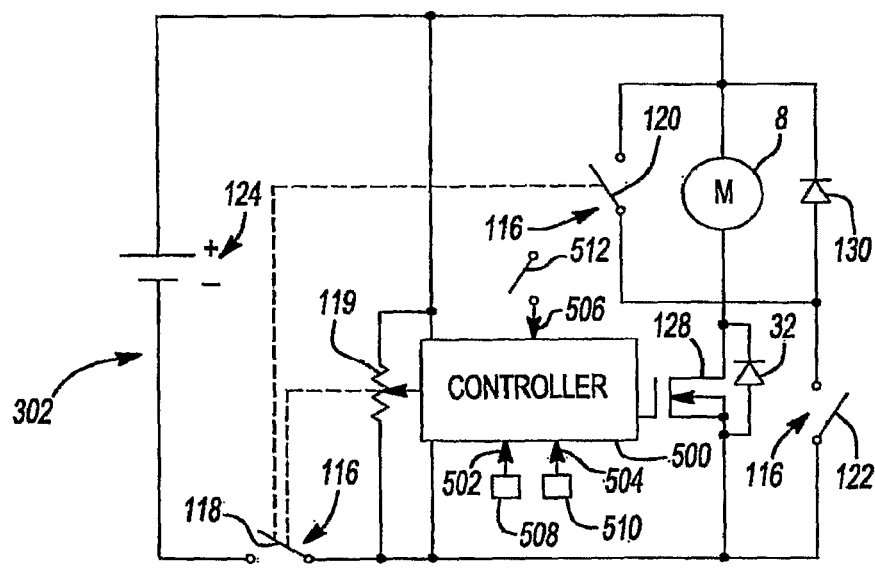
FIG. 5 is a schematic of a motor control circuit for the cordless power tool of FIG. 3.

In an aspect, motor control circuit 302 of cordless power tool 300 may be a pulse width modulated type of motor control circuit, such as an adaptation of motor control circuit 110 shown in FIG. 2. FIG. 5 shows such an adaptation of motor control circuit 110 of FIG. 2. Like elements will be identified with the same reference numbers and only the differences will be discussed. Controller 500 of motor control circuit 302 includes inputs 502, 504, 506 at which, illustratively, signals indicative of motor current motor speed, and the gear in which the transmission of gear case 12 is in, are input, respectively. Inputs 502, 504 may illustratively be coupled to a motor current sensor and a motor speed sensor, shown representatively by boxes 508, 510. Input 506 is illustratively coupled to a switch 512 which indicates when the transmission of gear case 12 is in the high speed/light torque range. Motor current sensor 508 and motor speed sensor 510 can be any known type of motor current sensor and motor speed sensor. Alternatively, inputs 502, 504 may simply be coupled to a part of motor control circuit 302 that produces a signal indicative of the desired parameter, such as motor current or motor speed.

In operation, controller 500 outputs a pulse width modulated signal to motor 8 to drive motor 8. When cordless power tool 300 is in the light torque/high speed mode, which controller 500 determines based on input 506, controller 500 varies the duty cycle of the pulse width modulated signal based on the motor speed at motor speed input 504 to maintain the speed of motor 8. This maintains the output speed of the transmission of gear case 12 constant, such as at 2000 RPM. Controller 500 also determines motor power based on motor current, as input at motor current input 502, and motor speed, as input at motor speed input 504. As is known, motor current is indicative of torque and motor speed is indicative of motor voltage. It should be understood that controller 500 can determine motor power in any known fashion. For example, motor voltage could be input to controller 500 and controller 500 determines motor power using motor current and motor voltage. When controller 500 determines that motor power has reached the predetermined percentage of the motor's maximum watts out, controller 500 ceases to maintain the speed of motor 8 constant. Instead, it allows the speed of motor 8 to follow the natural torque-speed curve of motor 8. It should be understood that if cordless power tool 300 is a variable speed power tool, controller 500 will maintain the motor speed constant when cordless power tool is in the high speed/light torque only if trigger 7 is in the full on position. If trigger 7 is partially released, then controller 500 will vary the speed of motor 8 accordingly and allow the speed of motor 8 to follow the natural torque-speed curve of motor 8.

In an aspect, the duty cycle of the pulse width modulated signal output by controller 500 to motor 8 is varied from seventy percent on to 100 percent on when the transmission of gear case 12 in the light torque range to maintain the speed of motor 8 constant. Illustratively, motor 8 reaches the predetermined percentage of its maximum watts out, such as seventy-five percent, when the duty cycle of the pulse width modulated signal reaches 100 percent on. Conversely, as the motor 8 is unloaded, the duty cycle of the pulse width modulated signal will begin to be decreased as the motor power drops below the predetermined percentage of the motor's maximum watts out so as to maintain the motor speed constant.

In an aspect, motor 8 has a maximum no-load speed that is at least fifty percent higher than the speed at which motor 8 is kept constant when the transmission of gear case 12 of cordless power tool 300 is in the light torque range. Illustratively, the maximum no-load speed of motor 8 is also 50% higher than the maximum no-load speed of a comparable size prior art motor 8 used in a comparable prior art power tool 1. This decreases power consumption when the motor 8 is operated at constant speed in the light torque range, increasing battery life.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A cordless power tool, comprising: a housing; a motor disposed in the housing; a gear case disposed in the housing that couples the motor to an output member, the gear case including multi-speed transmission having a plurality of speed ranges including a high speed/light torque range; a controller coupled to the motor that controls the speed of the motor, the controller being configured to drive the motor with a pulse width modulated signal and vary a duty cycle of the pulse width modulated signal to control the speed of the motor; the controller varying the power output of the motor to maintain an output speed of the motor constant when the multi-speed transmission is in the high speed/light torque range until motor power reaches a predetermined percentage of maximum watts out of the motor and then allowing the output speed to follow a natural torque-speed curve of the motor.

2. The apparatus of claim 1 wherein the power tool is a variable speed power tool having a trigger, the controller allowing the motor speed to follow the natural torque-speed curve of the motor when the trigger is in less than a full on position when the multi-speed transmission is in the high speed/light torque range.

3. The apparatus of claim 1 wherein the controller varies the duty cycle of the pulse width modulated signal from seventy percent on to one hundred percent on when maintaining the speed of the motor constant.

4. The apparatus of claim 3 wherein the power tool is a variable speed drill having a trigger, the controller allowing the motor speed to follow the natural torque-speed curve of the motor when the trigger is in less than a full on position when the multi-speed transmission is in the high speed/light torque range.

5. The apparatus of claim 1 wherein the predetermined percentage of maximum watts out of the motor is seventy-five percent.

6. The apparatus of claim 1 wherein the motor has a maximum no-load speed that is at least fifty-percent higher than the speed at which the motor speed is kept constant when the controller is maintaining the speed of the motor constant when the multi-speed transmission is in the high speed/light torque range.

7. The apparatus of claim 1, wherein the controller receives a signal indicative of whether the multi-speed transmission is in the high speed/light torque range and controls the output speed based on said signal.

8. A variable-speed cordless power tool, comprising: a housing; a motor disposed in the housing; a variable-speed trigger; a gear case disposed in the housing that couples the motor to an output member, the gear case including multi-speed transmission having a plurality of speed ranges, including a high speed/light torque range; a controller coupled to the motor that controls the speed of the motor based on an input from the variable-speed trigger; wherein, for a given displacement position of the trigger, the controller maintains an output speed of the motor constant when the multi-speed transmission is in the high speed/light torque range until motor power reaches a predetermined percentage of maximum watts out of the motor and then allows the output speed to follow a natural torque-speed curve of the motor.

9. The apparatus of claim 8, the controller allowing the motor speed to follow the natural torque-speed curve of the motor when the trigger is in less than a full on position when the multi-speed transmission is in the high speed/light torque range.

10. The apparatus of claim 8 wherein the controller drives the motor with a pulse width modulated signal and varies a duty cycle of the pulse width modulated signal to control the speed of the motor.

11. The apparatus of claim 10 wherein the controller varies the duty cycle of the pulse width modulated signal from seventy percent on to one hundred percent on when maintaining the speed of the motor constant.

12. The apparatus of claim 11, the controller allowing the motor speed to follow the natural torque-speed curve of the motor when the trigger is in less than a full on position when the multi-speed transmission is in the high speed/light torque range.

13. The apparatus of claim 8 wherein the predetermined percentage of maximum watts out of the motor is seventy-five percent.

14. The apparatus of claim 8 wherein the motor has a maximum no-load speed that is at least fifty-percent higher than the speed at which the motor speed is kept constant when the controller is maintaining the speed of the motor constant when the multi-speed transmission is in the high speed/light torque range.

\* \* \* \* \*